United States Patent [19]
Ellis

[11] Patent Number: 5,421,787
[45] Date of Patent: Jun. 6, 1995

[54] OPERATOR INTERACTIVE CONTROL OF SPEED AND TORQUE IN MACHINE TOOLS

[76] Inventor: Wayne Ellis, 607 Parkland Dr., Verona, Wis. 53593

[21] Appl. No.: 947,061

[22] Filed: Sep. 18, 1992

Related U.S. Application Data

[63] Continuation of Ser. No. 702,505, May 20, 1991, abandoned.

[51] Int. Cl.6 .............................................. F16H 7/08
[52] U.S. Cl. ...................... 474/101; 474/26; 474/114
[58] Field of Search .............. 474/26, 101, 69, 113, 474/114, 115, 112, 79, 128, 165, 198, 136, 148, 111, 149, 78, 80; 408/128

[56] References Cited
U.S. PATENT DOCUMENTS

| | | | |
|---|---|---|---|
| 2,200,175 | 5/1940 | Kaestner | 474/114 X |
| 2,215,831 | 9/1940 | Heyer | 474/26 X |
| 2,314,415 | 3/1943 | Morella | 474/26 X |
| 2,383,671 | 8/1945 | Murrle | 474/115 |
| 2,506,514 | 5/1950 | McKelvey | 474/79 X |
| 2,619,842 | 12/1952 | Felix | 408/128 X |
| 2,650,506 | 9/1953 | Montgomery | 474/79 X |
| 2,778,235 | 1/1957 | Amonsen | 474/26 X |
| 2,934,022 | 4/1960 | Rodick et al. | 474/26 X |
| 3,314,312 | 4/1967 | Niehaus, Jr. et al. | 408/128 |
| 3,665,805 | 5/1972 | Wolf | 408/66 X |
| 3,731,564 | 5/1973 | Diener et al. | 408/13 X |
| 3,762,830 | 10/1973 | Pettigrew | 408/135 |
| 4,209,273 | 6/1980 | Lehnen | 408/128 X |
| 4,349,945 | 9/1982 | Fox | 408/20 X |
| 4,381,174 | 4/1983 | Obler | 474/26 X |
| 4,831,364 | 5/1989 | Shinahara et al. | 408/9 X |
| 4,865,576 | 9/1989 | Hwang et al. | 474/115 X |
| 5,061,124 | 10/1991 | Chen | 408/128 X |

FOREIGN PATENT DOCUMENTS

| | | | |
|---|---|---|---|
| 626035 | 8/1961 | Canada | 474/113 |
| 96110 | 6/1939 | Denmark | 474/115 |
| 69109 | 1/1983 | European Pat. Off. | 474/113 |
| 412082 | 4/1925 | Germany | 474/114 |
| 493685 | 10/1938 | United Kingdom | 408/128 |

*Primary Examiner*—Rodney M. Lindsey
*Attorney, Agent, or Firm*—Keith Schoff

[57] ABSTRACT

The invention effects an increase in the range of continuously variable tool speed and torque control for machine tools beyond that conventionally available for operation from single phase alternating current. Interactive operator control of mechanical speed regulation is additively coupled to electrical control of direct current motor drive to reduce or eliminate machine down time needed for performing a series of varied machine operations.

9 Claims, 2 Drawing Sheets

OPERATOR INTERACTIVE CONTROL OF SPEED AND TORQUE IN MACHINE TOOLS

This is a continuation application of Ser. No. 07/702,505, filed May 20, 1991, now abandoned.

FIELD OF USE

Machine tools are provided with power transmission means in which the ratio of motor output shaft speed and torque to tool speed and torque can be changed.

BACKGROUND OF INVENTION

Electrical service furnishes 240 volts single phase alternating current to virtually all customers of power utilities in the United States. The relative inexpensiveness and widespread availability of such service has caused manufacturers to equip their machinery to utilize such current in power requirements up to about three horsepower, and also to manufacture products which utilize such current. The motors most commonly used with alternating current are characterized by near constant operating speed and low starting torque when compared to motors which utilize polyphase or direct current. Where a greater range of speed and torque control is required than is possible with single phase alternating current motors, motor driven generators or rectifiers may be used to supply direct current to a machine drive motor from single phase alternating current service.

The method and means of this invention increases the range of continuously variable tool speed and torque control from that heretofore available to operate machine tools from single phase alternating current by additively coupling interactive machine operator manual control of mechanical regulation of speed and torque to that of electrical control using direct current motor drive, to effect reduction or elimination of machine down time needed for performing a series of machine operations requiring differing tool speeds and torques.

SUMMARY OF THE INVENTION

Alternating current rectification, pole reversal switching, and voltage control in conjunction with interactive manual control of biasing of a variable diameter drive belt sheave provides a capability to a machine tool furnished with single phase alternating current to perform a greater range of machining operations than is possible with conventional machine drives using similar current and of similar motor ratings, without requiring down-time for changing drive belt or gear engagement necessary to complete the range of operations.

DESCRIPTION OF THE INVENTION

Figure 1:
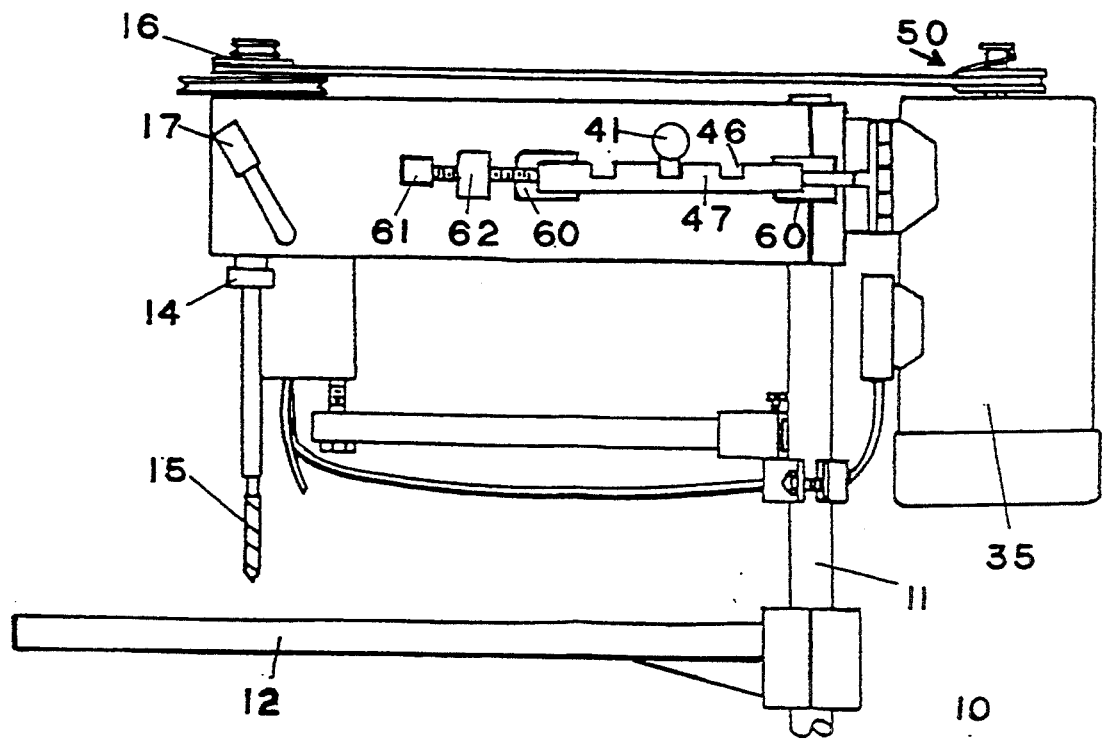
FIG. 1 is a right side elevational view, oriented with respect to a machine operator, of an embodiment of a portion of a drill press machine tool of this invention.
Figure 2:
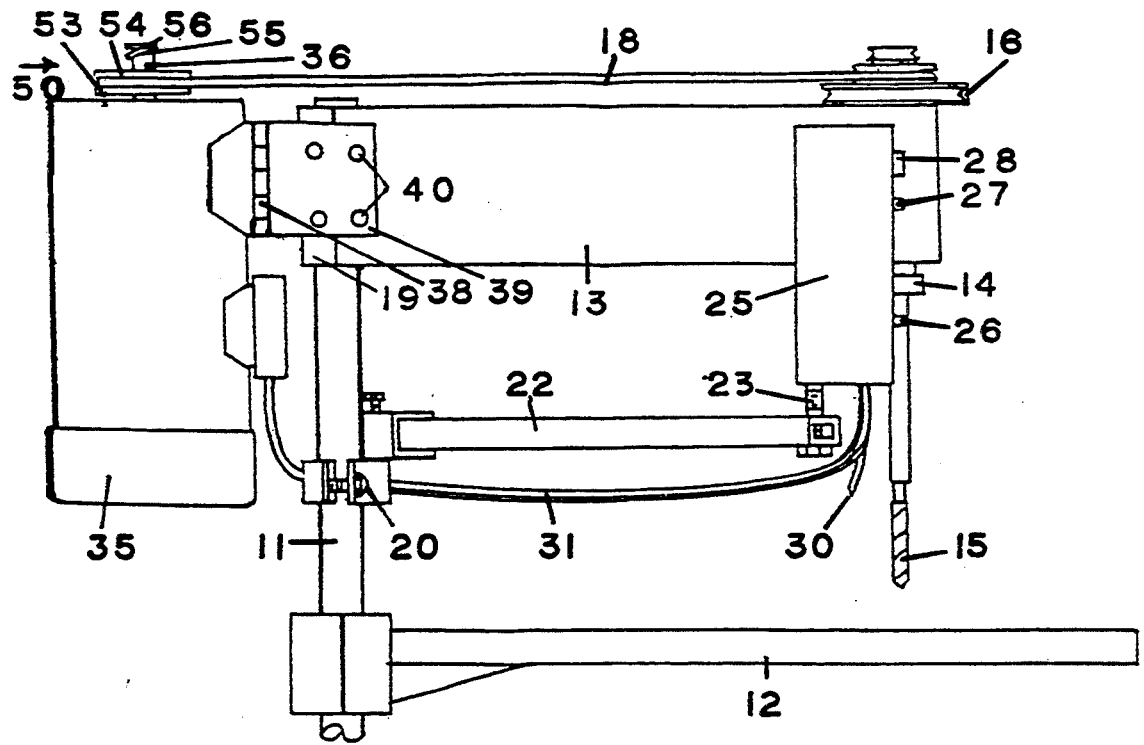
FIG. 2 is a left side elevational view of the embodiment of FIG. 1.
Figure 3:
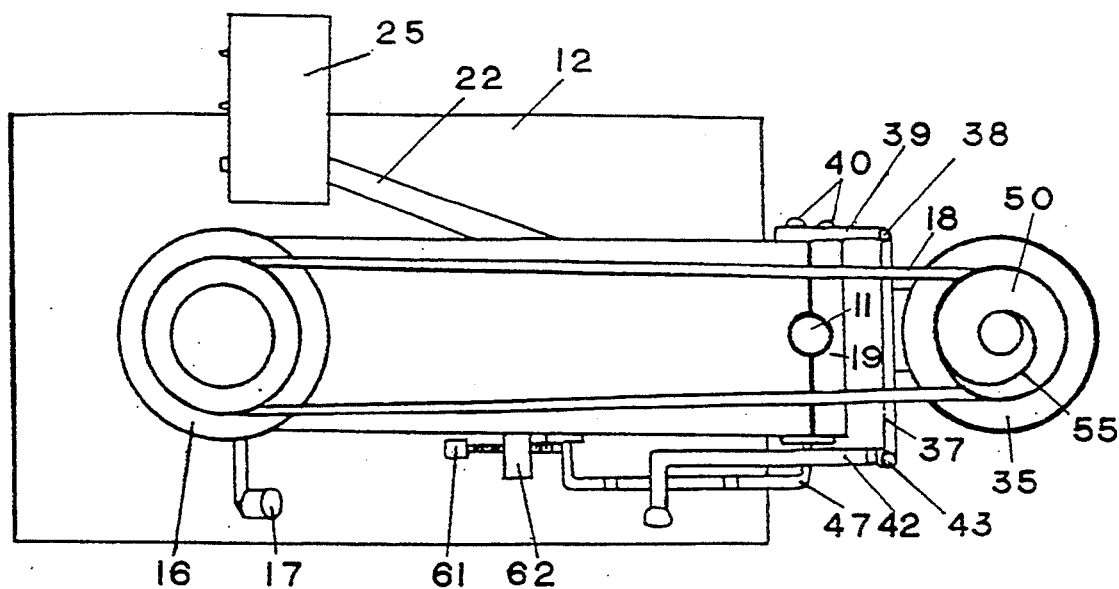
FIG. 3 is a top plan view of the embodiment of FIG. 1.

Referring to the drawings, FIGS. 1 and 2 shown drill press 10 in truncated elevational views with base standard deleted for convenience of illustration. A drill press is selected as an example of one type of machine tool embodying the method and means of this invention, with the application of the invention to other kinds of machine tools being apparent to persons skilled in the art, and such applications are included in the scope of invention described and claimed.

Post 11 extends vertically from a base standard, not shown, carrying elevationally adjustable work table 12 clamped thereon, and in addition carrying horizontally extending cabinet 13 housing the mechanisms for driving and for elevationally biasing drill chuck 14 and affixed drill bit 15. Multiply grooved, stepped diameter sheave 16 is fixed on a shaft, concealed from view, which carries chuck 14. Lever 17 is rotatively biased manually by a machine operator to operable raise and lower drill bit 15. Power transmission V-belt 18 is engaged with sheave 16 for rotatively driving chuck 14 and drill bit 15. Clamp bracket 19 is disposed on the opposite side of post 11 from that of cabinet 13, being bolted to the cabinet to tightly secure the assembly on post 11. The foregoing disclosure describes prior art and comprises no part of this invention.

Bracket 20 is frictionally clamped on post 11 for supporting arm 21. Adjustable, threaded rod 22 is threadedly engaged with the far reach of arm 22 for carrying control box 25. Within control box 25 are housed a rectifier for single phase alternating current, preferably a full wave rectifier, a voltage controller, a terminal reversing switch, and an on-off switch, all concealed from view. Control box 25 equipped as described can be purchased, for example, from Minarik Electric Company, Glendale, Calif.

Toggle switch levers 26, 27, and dial 28 are shown projecting from the front of control box 25, for controlling, respectively, voltage, on-off, and current reversing functions. Electrical lead 30 depending from control box 25 supplies single phase alternating current to drill press 10 through control box 25. Electrical lead 31 provides rectified current from control box 25 to junction box 33 on direct current motor 35. Motor 35 may be any suitably constructed motor, a preferred embodiment being a permanent magnet motor as manufactured, for example, by Leeson Electric Motor Corporation, Grafton, Wisc.

Motor 35 is fixedly mounted on hinge plate 37 for being arcuately moved together with the hinge plate around hinge connector 38, with hinge connector being disposed pivotally connecting fixed mounting plate 39 with hinge plate 37. Bolts 40 secure mounting plate 39 to cabinet 13. Hinge rod 42 is connected to the far reach of plate 37, enabling plate 37 to be manually biased around hinge connector 38 for altering the distance between sheave 16 mounted on cabinet 13 and sheave 50 mounted on motor shaft 36. Rod 42 as shown is is axially rotative and operably and outwardly movable in ball joint 43 mounted on hinge plate 37 so that handle portion 41 of rod 40 can be disengaged from notches 46 in bar 47 and the rod pushed, or raised and swung outwardly to increase the length of the lever arm before being pushed, to rotate hinge plate 37 about hinge connector 38 and lengthen the distance from sheave 16 to sheave 50. Bar 47 is adjustably mounted on the side of cabinet 13 by being engaged in slotted feet 60 for longitudinal movement to accommodate stretch in V-belt 18 which occurs from use. Three notches 46 conform to the positions of handle portion 41 of rod 40 corresponding to engagement of V-belt 18 in each of the three grooves in stepped diameter sheave 16. Adjusting screw 61 is threaded through tapped lug 62 on cabinet 13 to provide an adjustable stop against which bar 47 abuts under tension of V-belt 18 urging rod 42 and bar 47, with which handle portion 41 of rod 42 engages, toward the front of drill press 10.

Variable diameter sheave 50 is fixedly mounted on output shaft 36 of motor 35. Sheave 50 comprises lower flange 53 fixed on shaft 36, and upper flange 54 splined to be axially movable on shaft 36. Upper flange 54 is downwardly biased by compression spring 55 toward lower flange 53, with spring 53 disposed with its upper end extremity abutting head 56 at the top of shaft 36, and with the lower extremity of the axially extended spiral configuration of the spring contacting the outer peripheral extremity of upper flange 54 of sheave 50. Compression in spring 53 acts in opposition to tension in V-belt 18 in changing the pitch diameter of sheave 50, with tension decreasing the pitch diameter of sheave 50 and spring compression increasing it. Biasing of rod 40 in a direction which moves hinge plate 37 rearward and away from clamp bracket 19 increases tension in V-belt 18 and forces flange 54 of sheave 50 upward against the urging of spring 53 thereby decreasing the pitch diameter of sheave 50. In response to such manual biasing of rod 40 by a machine operator during drilling operations, the rotational speed of a tool such as drill bit 15 decreases and torque increases. Many drilling operation for bit diameters up to approximately one inch are best performed in steel stock at speeds of from about 50 to 85 revolutions per minute, with lower speeds being desirable for use with hole cutters. For use with taps, both lower speeds and repeated reversal of rotational direction are required. With drill press 10, all operations can be performed without requiring machine down-time for changing drive belt 18 on its sheaves. Rather, reduction in rotating speed and increase in torque beyond that available from motor control alone is provided by operator biasing of rod 40 in suitable manner, with tap use being made convenient and fast by use of reversing switch 27 to repeatedly reverse rotational direction of a tap drive. Myriad other situations in operating a drill press will present themselves in which one embodiment of invention described enables machining operations to proceed without requiring repositioning of drive belt or gears as otherwise would be required.

Adaptation of the disclosed invention to machine tools other than drill presses will be apparent to persons skilled in the art, such as, for example, to a milling machine, and such adaptation is included within the scope of the disclosure and claims of this specification. Other arrangements for tensioning drive belt 18 will be apparent, such as, for example, by use of belt tensioning idler sheave or pulley, which acts respectively, against the outer face or inner face of V-belt 18 between sheaves 16 an 50 for operably varying the pitch diameter of sheave 50. Means such as rod 40 for operating a belt tensioner may be mounted on either side of a machine tool such as drill press 10 for the convenience of a machine operator.

I claim:

1. Drive means for a machine tool supplied with single phase alternating current, an improvement providing a wide range of continuously variable cutting tool shaft speeds at high torque, comprising
    a) a current rectifier together with a voltage regulator having a plurality of selective settings,
    b) a direct current electric, tool rotation drive motor,
    c) power transmission means comprising a driving shaft having operably mounted thereon a first sheave and a driven shaft having mounted thereon a second sheave wherein at least one of said first sheave and said second sheave is a variable pitch diameter sheave,
    d) a power transmission belt operably engaged with said first sheave and said second sheave to transmit rotational motion from said driving shaft to said driven shaft,
    e) belt tensioning means operably biasable by a machine operator to increase tension and decrease tension in said power transmission belt to operably vary the pitch diameter of said variable pitch diameter sheave.

2. The drive means for a machine tool of claim 1 wherein said drive motor is a permanent magnet motor.

3. The drive means for a machine tool of claim 1 comprising a motor mounting pivotally disposed so that pivotal biasing thereof increase or reduces tension in said power transmission belt to operably vary the pitch diameter of said variable pitch diameter sheave by increasing or decreasing the distance between said driving shaft and said driven shaft.

4. The drive means for a machine tool of claim 1 wherein said power transmission belt is a V-belt.

5. The drive means for a machine tool of claim 1 wherein said variable pitch diameter sheave is spring biased.

6. The drive means for a machine tool of claim 1 comprising a motor mounting pivotally disposed so that pivotal biasing thereof increases or reduces tension in said power transmission belt to operably vary the pitch diameter of said variable pitch diameter sheave by increasing or decreasing the distance between said driving shaft and said driven shaft, and further comprising a lever connected for pivotally rotating said motor mounting by application of manually applied force thereagainst.

7. The drive means for a machine tool of claim 1 wherein said drive motor is provided with constant field flux.

8. A method for providing operator interactive operation of a machine tool powered by single phase alternating electric current in a manner to increase torque supplied to a cutting tool and decrease tool speed comprising the steps of:
    a) providing a single phase alternating current rectifier together with a voltage regulator having a plurality of selective settings,
    b) providing a direct current, electric tool-rotation drive motor,
    c) providing a V-belt engaged with a driving sheave and with a driven sheave wherein at least one said sheave is a variable pitch diameter sheave,
    d) providing an operator manipulated belt tensioning means for increasing and decreasing tension in said V-belt, whereby through increased or decreased tension in said V-belt, the pitch diameter of said variable pitch diameter sheave is varied, thereby to alter the rotational speed and the torque supplied by said driven sheave to a cutting tool and to provide optimum values of torque and rotational speed to a cutting tool when operator manipulation of said belt tensioning means is made in conjunction with operator selection of said selective settings.

9. The method of claim 8 wherein said belt tensioning means operates to increase or decrease the distance between said driven sheave and said driving sheave.

* * * * *